(12) United States Patent
Sahin et al.

(10) Patent No.: US 11,487,059 B2
(45) Date of Patent: Nov. 1, 2022

(54) PHOTONICS INTEGRATED CIRCUIT WITH SILICON NITRIDE WAVEGUIDE EDGE COUPLER

(71) Applicant: GLOBALFOUNDRIES U.S. Inc., Santa Clara, CA (US)

(72) Inventors: Asli Sahin, Danbury, CT (US); Karen A. Nummy, Newburgh, NY (US); Thomas Houghton, Marlboro, NY (US); Kevin K. Dezfulian, Arlington, VA (US); Kenneth J. Giewont, Hopewell Junction, NY (US); Yusheng Bian, Ballston Lake, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 50 days.

(21) Appl. No.: 17/179,532

(22) Filed: Feb. 19, 2021

(65) Prior Publication Data

US 2022/0268994 A1    Aug. 25, 2022

(51) Int. Cl.
*G02B 6/122* (2006.01)
*G02B 6/13* (2006.01)

(52) U.S. Cl.
CPC .............. *G02B 6/122* (2013.01); *G02B 6/13* (2013.01)

(58) Field of Classification Search
CPC ...... G02B 6/122; G02B 6/1228; G02B 6/125; G02B 6/13; G02B 6/136; G02B 6/124; G02B 6/14; G02B 6/305
See application file for complete search history.

(56) References Cited

U.S. PATENT DOCUMENTS

| | | | |
|---|---|---|---|
| 5,764,832 A | 6/1998 | Tabuchi | |
| 6,316,281 B1 | 11/2001 | Lee et al. | |
| 6,869,229 B2 | 3/2005 | Reedy et al. | |
| 7,831,123 B2 | 11/2010 | Sparacin et al. | |
| 10,191,215 B2 | 1/2019 | Kippenberg et al. | |
| 11,385,408 B2 * | 7/2022 | Bian ................. | G02B 6/126 |

(Continued)

FOREIGN PATENT DOCUMENTS

| JP | 02157805 A | 6/1990 |
|---|---|---|
| WO | 2017193220 A1 | 11/2017 |

OTHER PUBLICATIONS

U.S. Appl. No. 16/807,811, Non-Final Office Action dated Jun. 2, 2021, 21 pages.

(Continued)

*Primary Examiner* — Michael P Mooney
(74) *Attorney, Agent, or Firm* — Anthony Canale; Hoffman Warnick LLC

(57) ABSTRACT

A photonics integrated circuit includes a semiconductor substrate; a buried insulator layer positioned over the semiconductor substrate; and a back-end-of-line (BEOL) insulator stack over a first portion of the buried insulator layer. In addition, the PIC includes a silicon nitride (SiN) waveguide edge coupler positioned in a first region over the buried insulator layer and at least partially under the BEOL insulator stack. An oxide layer extends over a side of the BEOL insulator stack. The SiN waveguide edge coupler provides better power handling and fabrication tolerance than silicon waveguide edge couplers, despite the location under various BEOL layers. The PIC can also include silicon waveguide edger coupler(s).

20 Claims, 9 Drawing Sheets

(56) References Cited

U.S. PATENT DOCUMENTS

| | | | |
|---|---|---|---|
| 2002/0131727 A1 | 9/2002 | Reedy et al. | |
| 2002/0168144 A1 | 11/2002 | Chen et al. | |
| 2007/0014527 A1 | 1/2007 | Colgan et al. | |
| 2007/0274630 A1 | 11/2007 | Ghiron et al. | |
| 2017/0031094 A1 | 2/2017 | Nakashiba et al. | |
| 2019/0067911 A1 | 2/2019 | Caer et al. | |
| 2019/0154919 A1 | 5/2019 | Teng et al. | |
| 2019/0369341 A1* | 12/2019 | Shaw | G02B 6/4204 |
| 2019/0372676 A1 | 12/2019 | Iida et al. | |

OTHER PUBLICATIONS

Giewont et al., "300mm Monolithic Silicon Photonics Foundry Technology", IEEE Journal of Selected Topics in Quantum Electronics, vol. 25, No. 5, Sep./Oct. 2019, pp. 1-12.

Peng et al., "A CMOS Compatible Monolithic Fiber Attach Solution with Reliable Performance and Self-alignment", UTC From IEEE Xplore, Nov. 15, 2020, pp. 1-3.

Galan et al., "CMOS compatible silicon etched V-grooves integrated with a SOI fiber coupling technique for enhancing Fiber-to-chip alignment", IEEE, 2009, pp. 1-3.

Snyder et al., "Ultra-Broadband, Polarization-Insensitive SMF-28 Fiber Edge Couplers for Silicon Photonics", UTC from IEEE Xplore, Oct. 8, 2020, pp. 1-4.

Bian et al, "Towards low-loss monolithic silicon and nitride photonic building blocks in state-of-the-art 300mm CMOS foundry", Frontiers in Optics/Laser Science OSA, 2020, pp. 1-2.

Leger, "Fiber-chip edge coupler with large mode size for silicon photonic", https://www.osapublishing.org/oe/fulltext.cfm?uri=oe-24-5-5026&id=3, Dec. 14, 2020, pp. 1-20.

"Methods of Forming a V-Groove For A Fiber Optics Cable On An Integrated Photonics Chip" U.S. Appl. No. 16/807,811, filed Mar. 3, 2020.

U.S. Appl. No. 16/807,811, Final Office Action dated Nov. 5, 2021, 18 pages.

* cited by examiner

PHOTONICS INTEGRATED CIRCUIT WITH SILICON NITRIDE WAVEGUIDE EDGE COUPLER

BACKGROUND

The present disclosure relates to photonics integrated circuits (PICs), and more specifically, to a PIC having a silicon nitride waveguide edge coupler.

Photonics integrated circuits are used in many applications. A photonics chip integrates optical components, such as waveguides, couplers, photodetectors, etc., and electronic components, such as integrated circuits comprised of complementary metal oxide semiconductor (CMOS) based elements, such as field-effect transistors, into a unified platform. The optical components are formed in a photonics region of the product while the CMOS-based integrated circuits are formed in a CMOS region of the product. In the CMOS region of a PIC, various front-end-of-line (FEOL) processing activities and structures (e.g., transistors, capacitors, resistors, etc.) are formed. FEOL structures are not formed in the photonics region. Additionally, various back-end-of-line (BEOL) structures such as interconnecting conductive lines and vias are formed within insulating material layers in the CMOS region. The photonics region is substantially free of conductive lines and vias similar to those formed in the CMOS region, but the layers of BEOL insulating material and etch stop layers that were formed in the CMOS region are also be formed in the photonics region. Due to their varying refractive index, the BEOL insulating layers in the photonics region can make it a challenge to form a waveguide edge coupler for optically communicating with a fiber optic cable that delivers optical signals to the PIC. Notably, it is challenging to form insulative materials having optimal refractive index matching to ensure optimal optical performance of the device. Silicon waveguide edge couplers are common, but they have power handling and fabrication tolerance issues.

SUMMARY

An aspect of the disclosure is directed to a photonics integrated circuit, comprising: a semiconductor substrate; a buried insulator layer positioned over the semiconductor substrate; a back-end-of-line (BEOL) insulator stack over a first portion of the buried insulator layer; a silicon nitride (SiN) waveguide edge coupler positioned in a first region over the buried insulator layer and at least partially under the BEOL insulator stack; and a first oxide layer extending over a side of the BEOL insulator stack.

Another aspect of the disclosure includes a photonics integrated circuit, comprising: a semiconductor substrate; a buried insulator layer positioned over the semiconductor substrate; a back-end-of-line (BEOL) insulator stack over a first portion of the buried insulator layer; a silicon nitride (SiN) waveguide edge coupler positioned in a first region over the buried insulator layer and at least partially under the BEOL insulator stack; and a first oxide layer extending over a side of the BEOL insulator stack.

An aspect of the disclosure related to a method comprising: forming a silicon waveguide edge coupler in a semiconductor layer over a buried insulator layer over a semiconductor substrate; forming a silicon nitride waveguide edge coupler over the buried insulator layer over the semiconductor substrate, wherein at least part of a back-end-of-line (BEOL) insulator stack is over the silicon waveguide edge coupler and the silicon nitride waveguide edge coupler; forming an oxide layer over the silicon waveguide edge coupler, the silicon nitride waveguide edge coupler and the BEOL insulator stack; forming a V-groove defined in the semiconductor substrate at an end of the silicon waveguide edge coupler; and forming a squared groove defined in the semiconductor substrate at an end of the silicon nitride waveguide edge coupler.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein.

Figure 1:
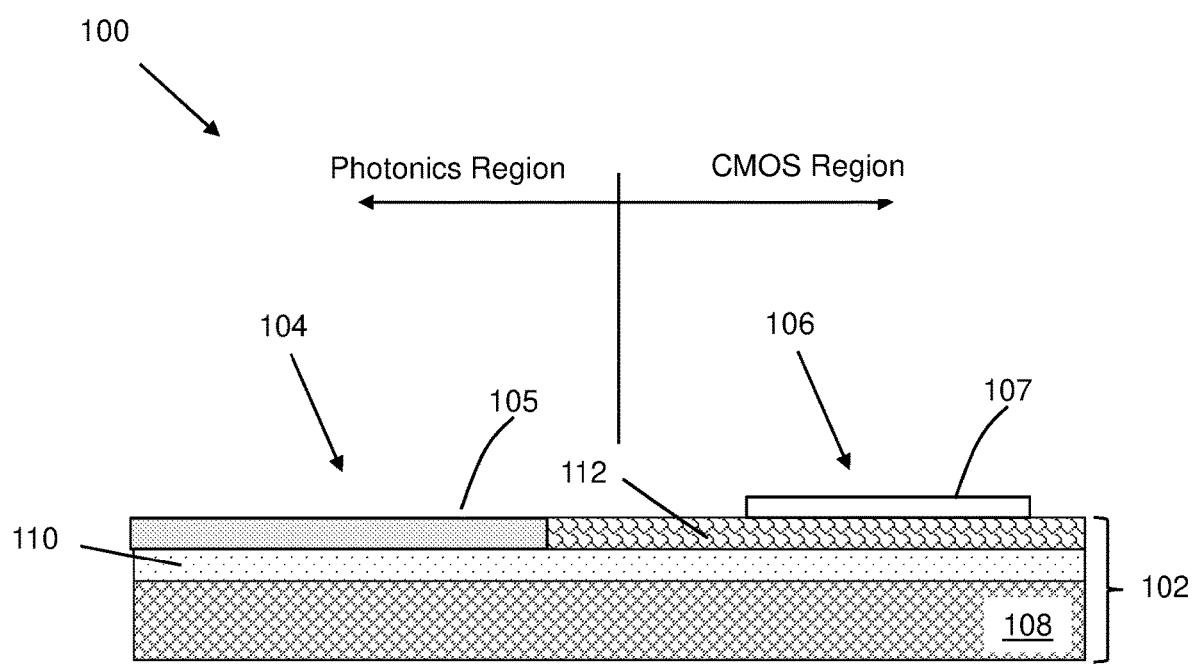
FIG. 1 shows a cross-sectional, schematic view of a photonics integrated circuit (PIC) including a photonics regions and a CMOS region, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

With reference to FIG. 1, a photonics integrated circuit (PIC) or photonics chip 100 will be formed above a semiconductor substrate 102. PIC 100 comprises a photonics region 104 where optical components 105 (shown schematically) will be formed, and a CMOS region 106 where CMOS-based integrated circuits 107 (shown schematically) based upon NFET and PFET transistors will be formed. As understood in the art, CMOS region 106 is operatively coupled to waveguide edge couplers in photonics region 104, e.g., a silicon nitride waveguide edge coupler 122 and/or silicon waveguide coupler 150, as will be described herein. Substrate 102 may have a variety of configurations, such as a semiconductor-on-insulator (SOI) shown in FIG. 1. An SOI substrate 102 includes a base semiconductor substrate 108, a buried insulator layer 110 positioned on semiconductor substrate 108 and an active semiconductor layer 112 positioned above buried insulator layer 110, wherein the optical components and the CMOS-based integrated circuits will be formed adjacent to, in and above active semiconductor layer 112. The thickness of active semiconductor layer 112 and buried insulator layer 110 may vary depending upon the particular application. Active semiconductor layer 112 and semiconductor substrate 108 need not be made of the same semiconductor material, but that may be the case in some applications. In some applications, active semiconductor layer 112 and semiconductor substrate 108 may be made of silicon or they may be made of semiconductor materials other than silicon. Thus, the terms "substrate" or "semiconductor substrate" should be understood to cover all semiconductor materials and all forms of such materials. Buried insulator layer 110 may comprise any desired insulating material, e.g., undoped silicate glass (USG), silicon dioxide (oxide), etc.

FIGS. 2-9 show various embodiments of a portion of photonics region 104 of PIC 100 where waveguide edge coupler(s) optically couples to a fiber optic cable.

Figure 2:
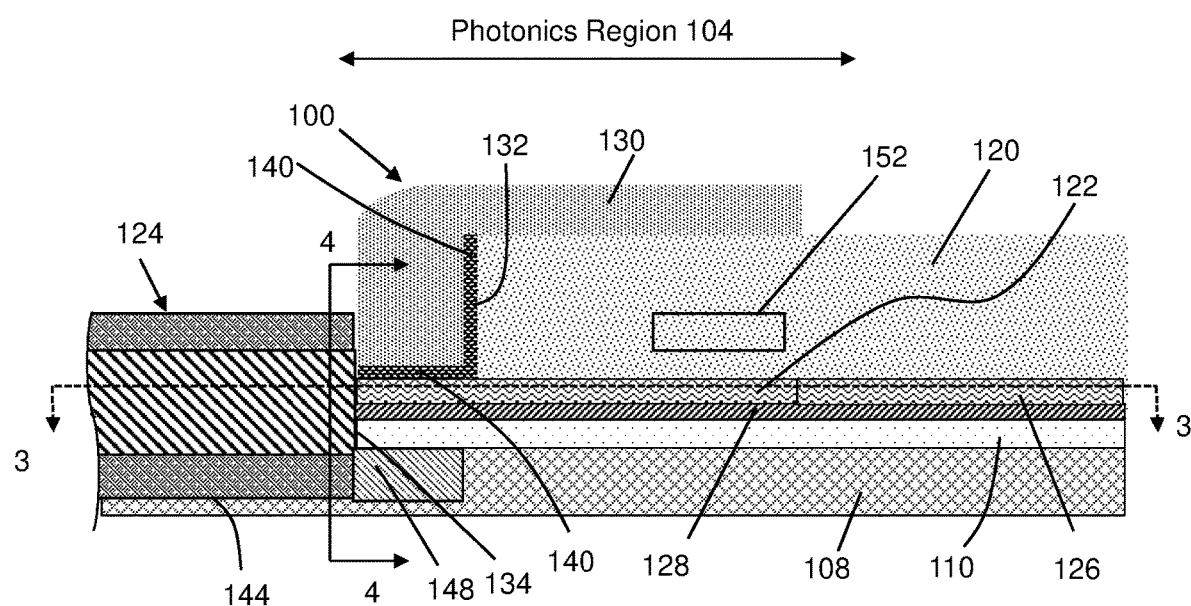
FIG. 2 shows a cross-sectional view of a PIC with a silicon nitride (SiN) waveguide edge coupler, according to embodiments of the disclosure.
Figure 3:
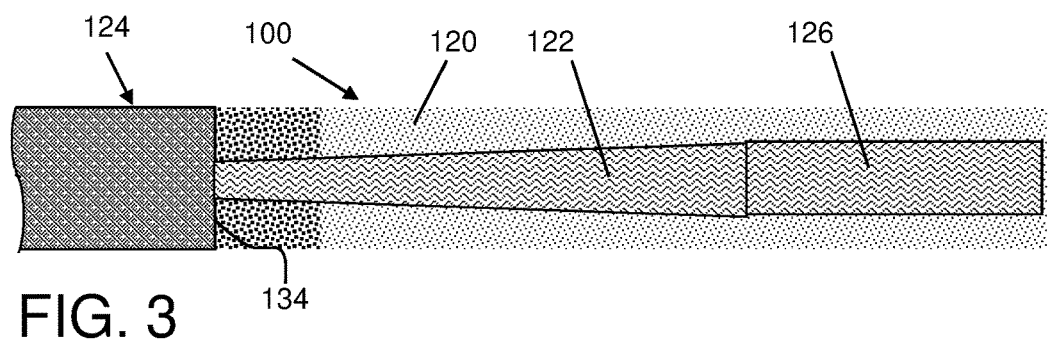
FIG. 3 shows a top down view along view line 3-3 in FIG. 2 of the PIC with the SiN waveguide edge coupler, according to embodiments of the disclosure.
Figure 4:
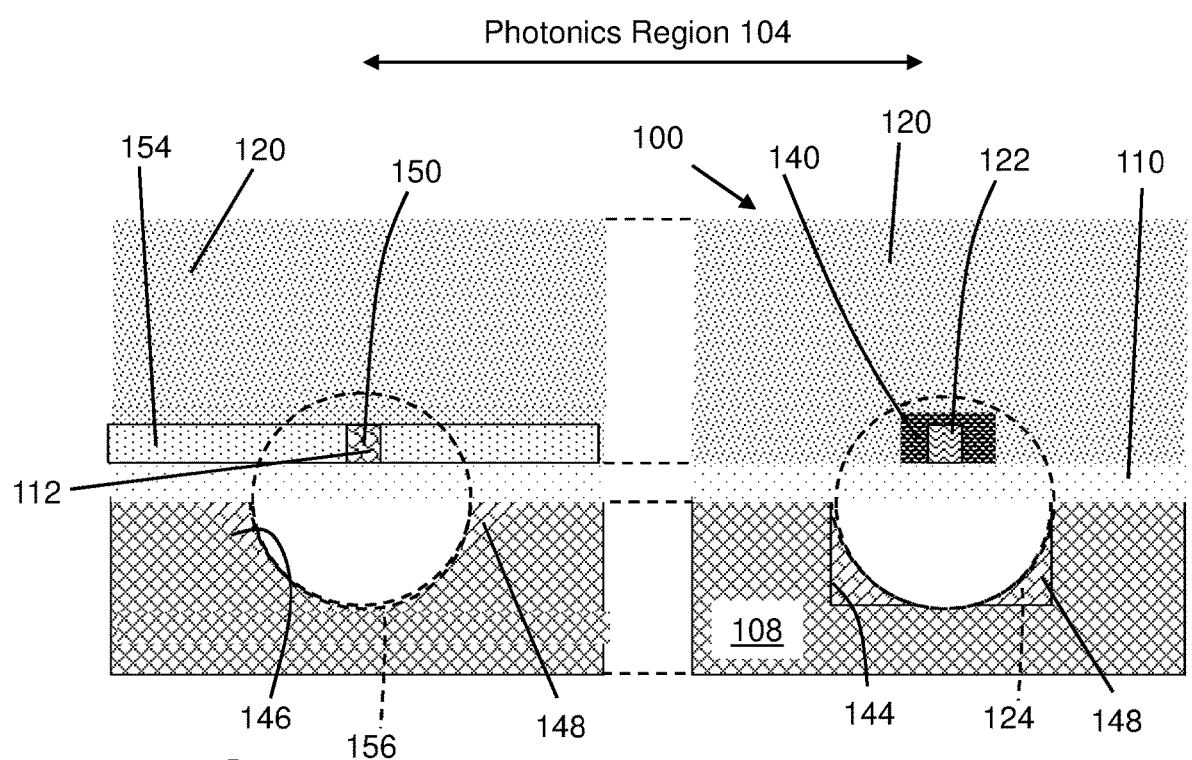
FIG. 4 shows a cross-sectional view of a PIC with a SiN waveguide edge coupler and a silicon (Si) waveguide edge coupler in a photonics region thereof, according to embodiments of the disclosure.

FIG. 2 shows a cross-sectional view of one embodiment of a silicon nitride waveguide edge coupler in PIC 100, FIG. 3 shows a top down view of the embodiment of FIG. 2 along view line 3-3, and FIG. 4 shows a cross-sectional view of the embodiment of FIG. 2 along view line 4-4. As noted relative to FIG. 1, PIC 100 includes semiconductor substrate 108, and buried insulator layer 110 positioned over semiconductor substrate 108. FIG. 2 also shows a back-end-of-line (BEOL) insulator stack 120 over a first portion of buried insulator layer 110. Here, active semiconductor layer 112 has been removed. BEOL insulator stack 120 may include a number of insulator layers (not individually shown) typically used to make BEOL interconnect layers in CMOS region 106 (FIG. 1), but devoid of line or via metal connections in photonics region 104 (FIGS. 1 and 2). BEOL insulator stack 120 may include any now known or later developed interlayer dielectrics. Suitable dielectric materials include but are not limited to: carbon-doped silicon dioxide materials; undoped silicate glass (USG); borophosphosilicate glass (BPSG); fluorinated silicate glass (FSG); organic polymeric thermoset materials; silicon oxycarbide; carbon-doped oxide (SiCOH) dielectrics; fluorine doped silicon oxide; spin-on glasses; silsesquioxanes, including hydrogen silsesquioxane (HSQ), methyl silsesquioxane (MSQ) and mixtures or copolymers of HSQ and MSQ; benzocyclobutene (BCB)-based polymer dielectrics, and any silicon-containing low-k dielectric. For purposes of description, BEOL insulator stack 120 may include layers of BPSG, i.e., glass. In any event, BEOL insulator stack 120 includes dielectrics having a refractive index that makes use of a silicon waveguide edge coupler in active semiconductor layer 112 (not in FIG. 2) challenging to use. Other BEOL layers (not shown) may be formed over BEOL insulator stack 120, as required, e.g., a first metal SICOH layer.

Embodiments of PIC 100 according to the disclosure include a silicon nitride (SiN) waveguide edge coupler 122, which provides improved optical communication with a fiber optic cable 124 compared to silicon waveguide edge couplers. SiN waveguide edge coupler 122 is positioned in a first region of photonics region 104 over buried insulator layer 110 and at least partially under BEOL insulator stack 120. SiN waveguide edge coupler 122 is in optical communication with fiber optic cable 124. For example, cable 124 and coupler 122 may abut one another to allow optical signals to pass from one to the other, or may optically communicate by optical signals passing through intervening dielectric material such as an oxide, as will be described herein. (Note, despite view line 4-4 in FIG. 2 crossing fiber optic cable(s), cable(s) 124 is shown in dashed lines in FIG. 4 to illustrate the end of waveguide edge couplers.) In certain embodiments, PIC 100 may also include an oxide layer 128 (FIG. 2 only, not in FIG. 4) under SiN waveguide edge coupler 122, but this additional layer may not be necessary. Oxide layer 128 may be a different type of oxide from buried insulator layer 110 and oxide layer 130. As shown in FIG. 3, SiN waveguide coupler 122 may have an inverse taper from fiber optic cable 124 to an integral silicon nitride (SiN) waveguide 126 to which it is optically coupled.

PIC 100 also includes an oxide layer 130 extending over a side 132 of BEOL insulator stack 120. In one non-limiting example, oxide layer 130 may include a tetraethyl orthosilicate, $Si(OC_2H_5)_4$ (TEOS) based silicon dioxide ($SiO_2$). TEOS $SiO_2$ may be advantageous because it has a refractive index that matches buried insulator layer 110.

In FIGS. 2 and 3, SiN waveguide edge coupler 122 extends under oxide layer 130 to an outer edge 134 of oxide layer 130, buried insulator layer 110 and semiconductor substrate 108. In this case, SiN waveguide edge coupler 122 is in direct contact with fiber optic cable 124. As shown in FIG. 3, in a horizontal plane, SiN waveguide edge coupler 122 may taper toward outer edge 134, and near fiber optic cable 124. In certain embodiments, PIC 100 may also include a moisture barrier layer 140 between oxide layer 130 and side 132 of BEOL insulator stack 120. In certain embodiments, moisture barrier layer 140 may also extend between oxide layer 130 and SiN waveguide edge coupler 122, forming an L-shape with the portion on side 132 of BEOL insulator stack 120. Moisture barrier layer 140 may include, for example, an optically compatible moisture barrier nitride. This embodiment may omit a silicon (Si) waveguide edge coupler(s) 150, as provided in other structures.

As shown in FIG. 2, PIC 100 may also include an optical component 152 positioned over SiN waveguide edge coupler 122 and above buried insulator layer 110, e.g., in BEOL insulator stack 120 or later formed insulator layers. Optical component 152 can include any form of optical devices including but not limited to a second waveguide, a light coupler and/or a photodetector.

As shown in FIG. 4, PIC 100 may also include a squared groove 144 defined in semiconductor substrate 108 in which fiber optic cable 124 is positioned. While squared groove 144 is described as "squared," it should be recognized that one or more corners thereof may be at least partially rounded. The squared groove 144 is so defined to differentiate it from a more common V-groove 146, which may be used for a silicon (Si) waveguide edge coupler(s) 150 used in other regions of photonic region 104. As shown in FIG. 4, fiber optic cable 124 may be positioned in squared groove 144 and in optical communication with an end of SiN waveguide edge coupler 122. That is, squared groove 144 is sized to position a fiber core of cable 124 with edge coupler 122 so optical signals can pass from/to cable 124 and/or edge coupler 122. Fiber optic cable 124 may be fixed in squared groove 144 in any now known or later developed manner, e.g., a refractive index matching epoxy or polymer 148.

Figure 5:
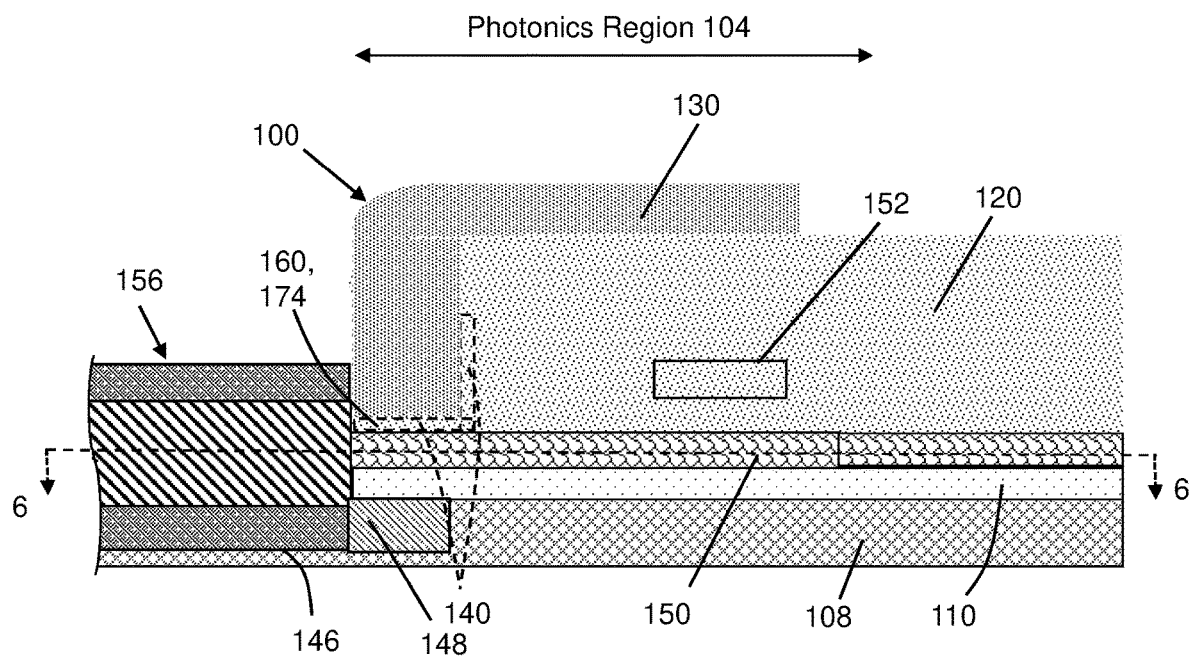
FIG. 5 shows a cross-sectional view of the Si waveguide edge coupler, according to embodiments of the disclosure.
Figure 6:
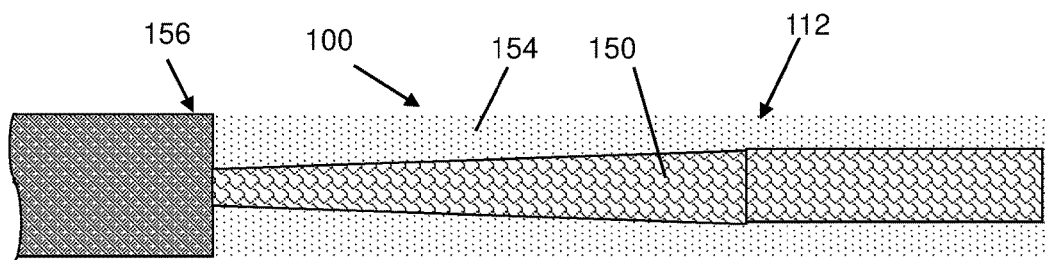
FIG. 6 shows a top down view along view line 6-6 in FIG. 5 of the PIC with the Si waveguide edge coupler, according to embodiments of the disclosure.

As illustrated in FIGS. 4-6, PIC 100 can also include Si waveguide edge coupler 150 positioned in a second region over buried insulator layer 110 and under BEOL insulator stack 120. FIG. 5 shows a cross-sectional view of one embodiment of Si waveguide edge coupler 150 in PIC 100, and FIG. 6 shows a top down view of the embodiment of FIG. 5 along view line 5-5. As illustrated, Si waveguide edge coupler 150 is formed in semiconductor layer 112 (FIG. 4, 6) isolated by shallow trench isolations 154, e.g., of oxide. In contrast to SiN waveguide edge coupler 122, PIC 100 may include a V-groove 146 defined in semiconductor substrate 108 for Si waveguide edge coupler 150. Another fiber optic cable 156 (shown by dashed lines in FIG. 4) may be positioned in V-groove 146 and in optical communication with Si waveguide edge coupler 150. Fiber optic cable 156 may be fixed in V-groove 146 in any now known or later developed manner, e.g., a refractive index matching epoxy or polymer 148. Si waveguide edge coupler 150 may also optionally include moisture barrier layer 140 (shown in dashed line)

Figure 7:
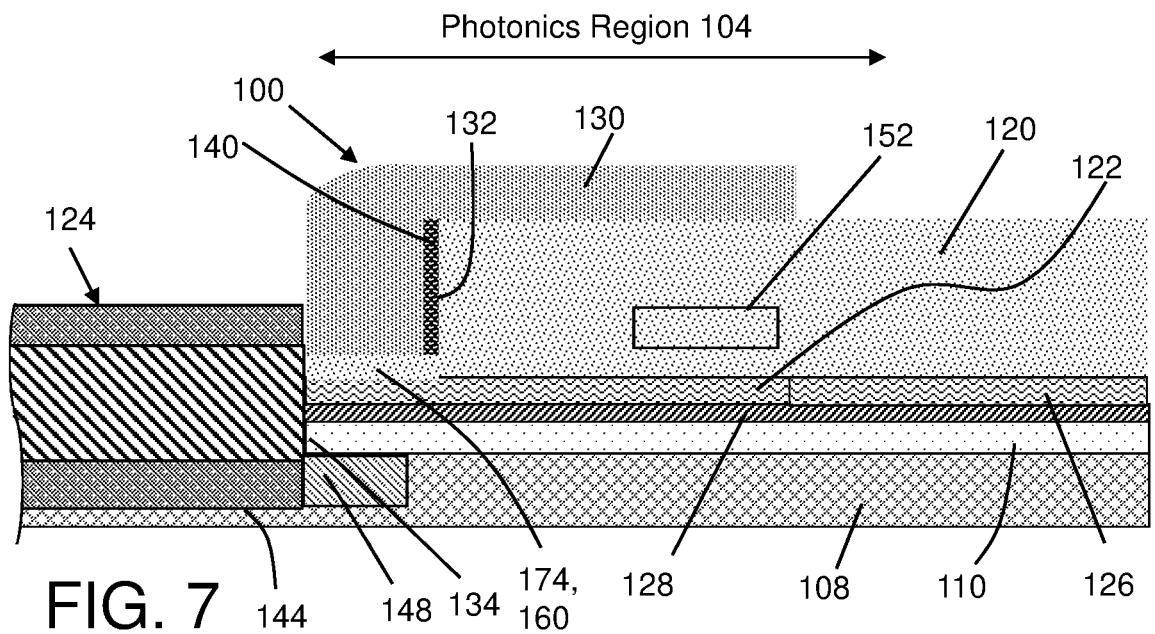
FIG. 7 shows a cross-sectional view of a PIC with SiN waveguide edge coupler, according to other embodiments of the disclosure.

The end location of SiN waveguide edge coupler 122 relative to BEOL stack 120 and oxide layer 130 may vary according to various embodiments of the disclosure. FIG. 7 shows a cross-sectional view of PIC 100 in which SiN waveguide edge coupler 122 is arranged the same as in FIGS. 2-4, but with a low refractive index dielectric layer 160 extending between oxide layer 130 and SiN waveguide edge coupler 122, rather than moisture barrier layer 140 (FIG. 2). Low refractive index dielectric layer 160 may include, for example, undoped silica glass (USG), TEOS, or BPSG of BEOL insulator stack 120 that is not removed prior to forming oxide layer 130.

Figure 8:
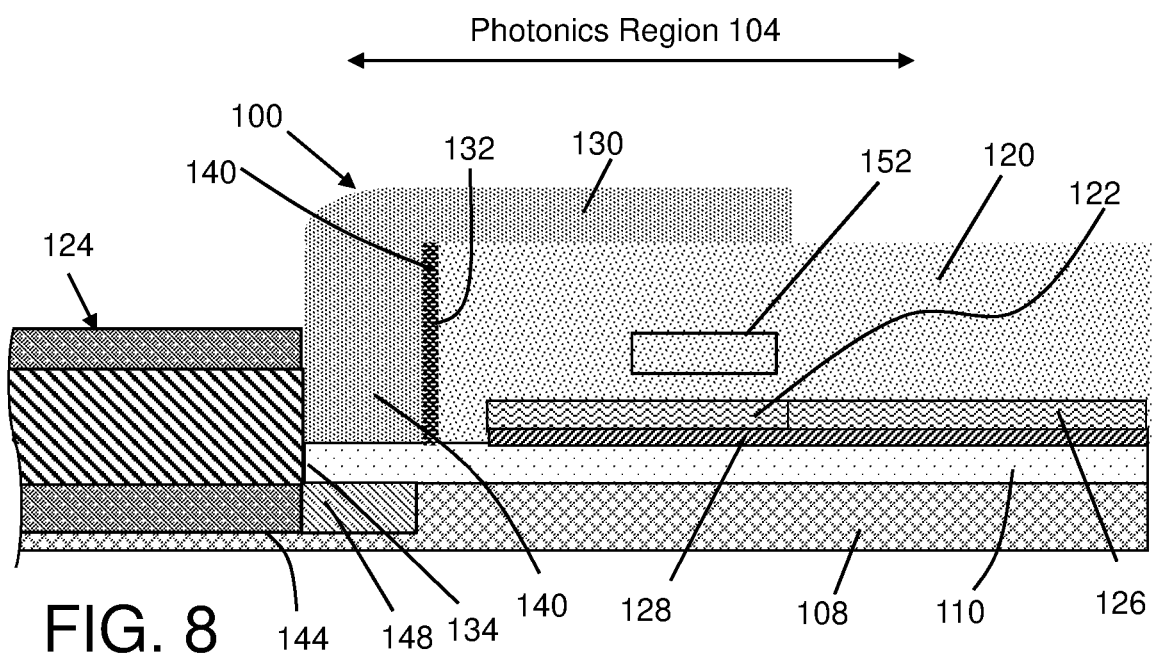
FIG. 8 shows a cross-sectional view of a PIC with SiN waveguide edge coupler, according to yet other embodiments of the disclosure.

FIG. 8 shows a cross-sectional view of PIC 100 in which SiN waveguide edge coupler 122 is entirely enclosed by BEOL insulator stack 120. SiN waveguide edge coupler 122 does not extend beyond side 132 of BEOL insulator stack 120. Here, fiber optic cable 124 is in optical communication with SiN waveguide edge coupler 122 through oxide layer 130, moisture barrier layer 140 (where provided) and a portion of BEOL insulator stack 120. This arrangement assumes the refractive index/indices of the intervening dielectric(s) are sufficient to allow optical communication.

Figure 9:
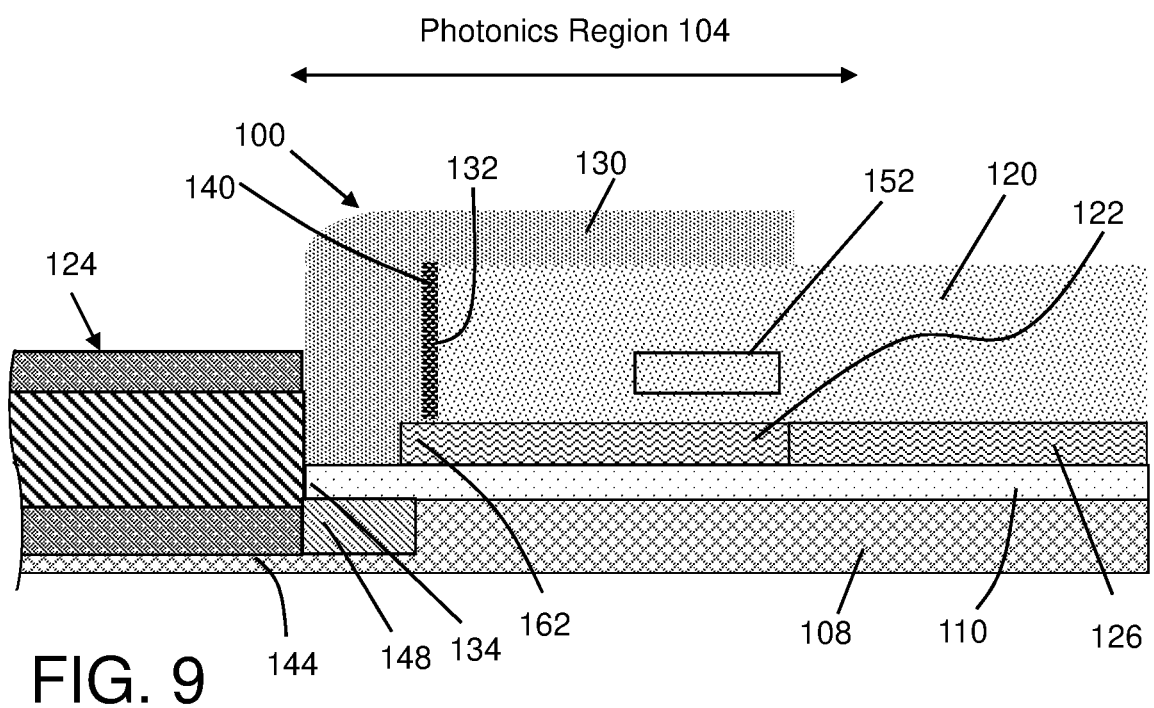
FIG. 9 shows a cross-sectional view of a PIC with SiN waveguide edge coupler, according to additional embodiments of the disclosure.

FIG. 9 shows a cross-sectional view of PIC 100 in which SiN waveguide edge coupler 122 includes an end 162 extending into oxide layer 130 from under BEOL insulator stack 120, but does not reach edge 134 of buried insulator layer 110. Here, fiber optic cable 124 is in optical communication with SiN waveguide edge coupler 122 through only oxide layer 130.

FIGS. 10-15 show cross-sectional views of embodiments of a method of forming PIC 100 and, more particularly, forming portions of PIC 100 regarding oxide layer 130 formation, and V-groove 146 and squared groove 144 formation, that differ from conventional processing. For purposes of description, embodiments of the disclosure will be described with both SiN and Si waveguide edge couplers 122, 150 being present. It should be recognized, however, that Si waveguide edge coupler 150 formation may be omitted, where desired.

Figure 10:
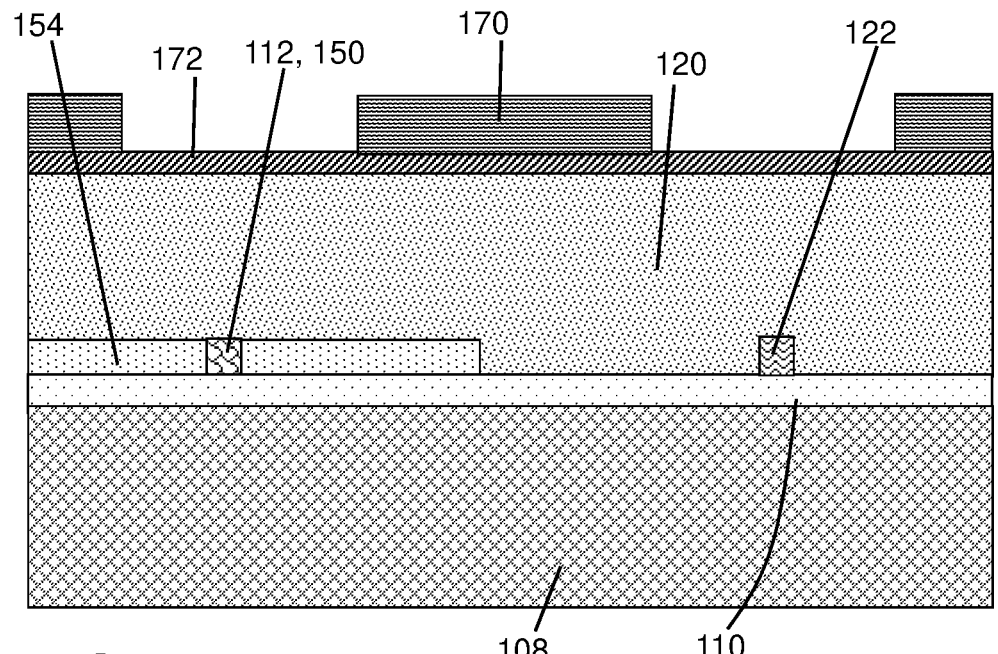
FIG. 10 shows a cross-sectional view of a preliminary structure for a method of forming a PIC with SiN waveguide edge coupler, according to embodiments of the disclosure.

FIG. 10 shows a preliminary structure including forming Si waveguide edge coupler 150 in semiconductor layer 112 over a buried insulator layer 110 over semiconductor substrate 108, and forming SiN waveguide edge coupler 122 over buried insulator layer 110 over semiconductor substrate 108. Each waveguide edge coupler 122, 150 may be formed using any now known or later developed processing. SiN waveguide edge coupler 122 is shown in BEOL insulator stack 120, and Si waveguide edge coupler 150 is shown in semiconductor layer 112 and surrounded by STI 154. Typically, BEOL insulator stack 120 includes a nitride layer 172 over the stack (shown), and another nitride etch stop layer between the stack and buried insulator layer 110. In contrast to conventional techniques, the nitride etch stop layer between BEOL insulator stack 120 and buried insulator layer 110 is removed prior to what is shown in FIG. 10. A mask 170 may be formed over a nitride cap 172 over BEOL insulator stack 120. Mask 170 exposes areas in which groove 144 or 146 will be formed.

Figure 11:
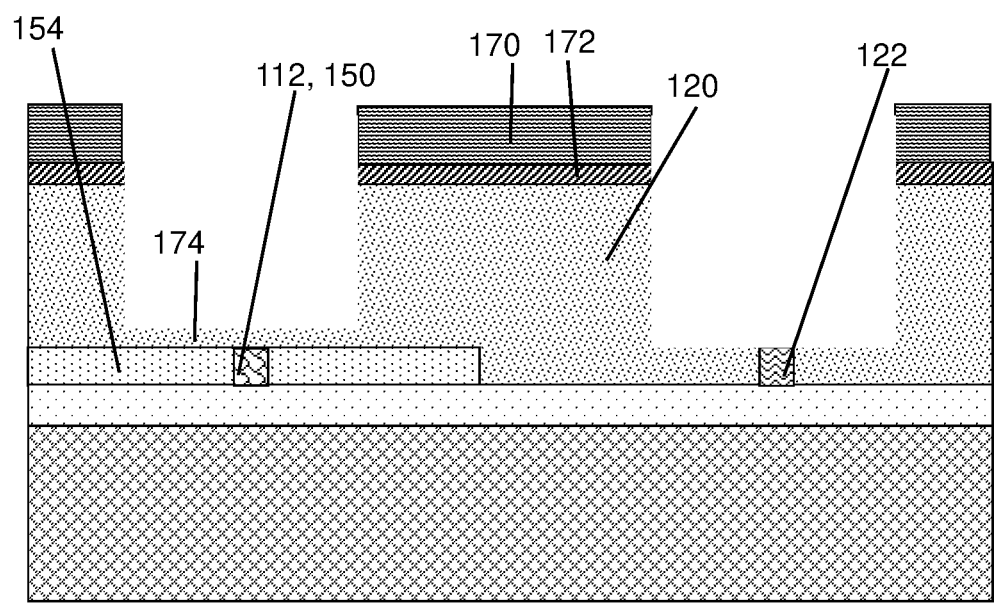
FIG. 11 shows a cross-sectional view of removing at least part of a BEOL insulator stack, according to embodiments of the disclosure.

FIG. 11 shows removing at least part of BEOL insulator stack 120 over Si waveguide edge coupler 150 and SiN waveguide edge coupler 122, i.e., where oxide layer 130 is later formed. In certain embodiments, only a part of BEOL insulator stack 120 is removed over SiN waveguide edge coupler 122 and SiN waveguide edge coupler 122, where oxide layer 130 is later formed. It is noted that because SiN waveguide edge coupler 122 is present, a nitride etch stop layer is not necessary. Similarly, a nitride etch stop layer is not necessary over Si waveguide edge coupler 150 because BEOL insulator stack 120 is not fully removed from over the coupler. As illustrated in FIGS. 5 and 11, a portion 174 of BEOL insulator stack 120 may remain over Si waveguide edge coupler 150, where oxide layer 130 is later formed. In alternative embodiments, oxide layer 130 may contact Si waveguide edge coupler 150. Similarly, in certain embodiments, shown in FIGS. 2, 8 and 9, none of BEOL insulator stack 120 remains over SiN waveguide edge coupler 122, where oxide layer 130 is later formed. Alternatively, as shown in FIG. 7, in certain embodiments, only a part of BEOL insulator stack 120 is removed over Si waveguide edge coupler 150 and SiN waveguide edge coupler 122, where oxide layer 130 is formed. Where some of BEOL insulator stack 120 remains, it may include any BEOL insulating material such as low refractive index dielectric layer 160 (FIGS. 5 and 7). The removing step may be carried out by any appropriate etch, e.g., a reactive ion etch, using mask 170.

Figure 12:
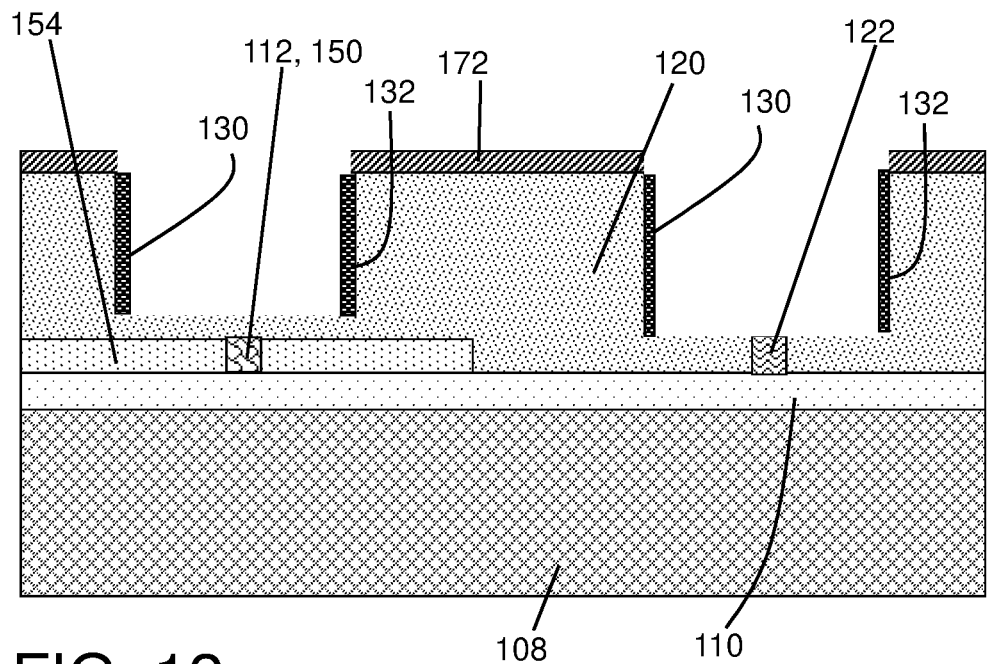
FIG. 12 shows a cross-sectional view of optionally forming a moisture barrier layer, according to embodiments of the disclosure.

FIG. 12 shows optionally forming moisture barrier layer 140 over at least side 132 of BEOL insulator stack 120 adjacent Si waveguide edge coupler 150 and adjacent SiN waveguide edge coupler 122, after the removing BEOL insulator stack 120. Prior to the step shown in FIG. 12, mask 170 may be removed using any appropriate process, e.g., an ashing process. Moisture barrier layer 140 may be deposited over the structure, e.g., using any appropriate deposition technique, and then etched back to form the structure in FIG. 12.

Figure 13:
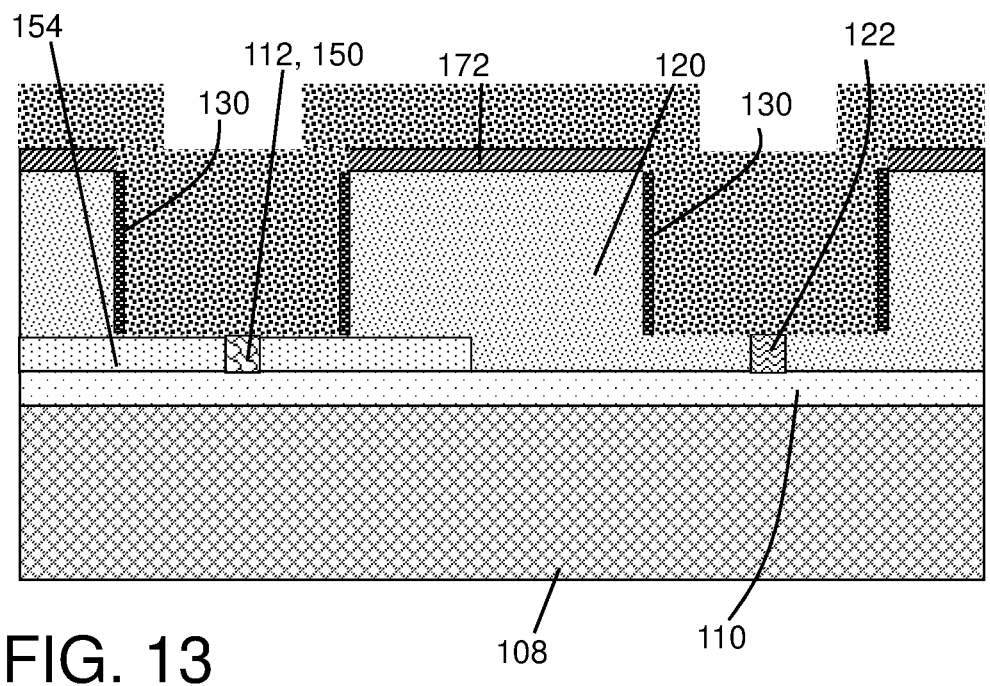
FIG. 13 shows a cross-sectional view of forming an oxide layer, according to embodiments of the disclosure.

FIG. 13 shows forming an oxide layer 130 over Si waveguide edge coupler 150, SiN waveguide edge coupler 122 and at least part BEOL insulator stack 120. Oxide layer 130 may be formed using any appropriate deposition technique, e.g., for forming TEOS oxide.

Figure 14:
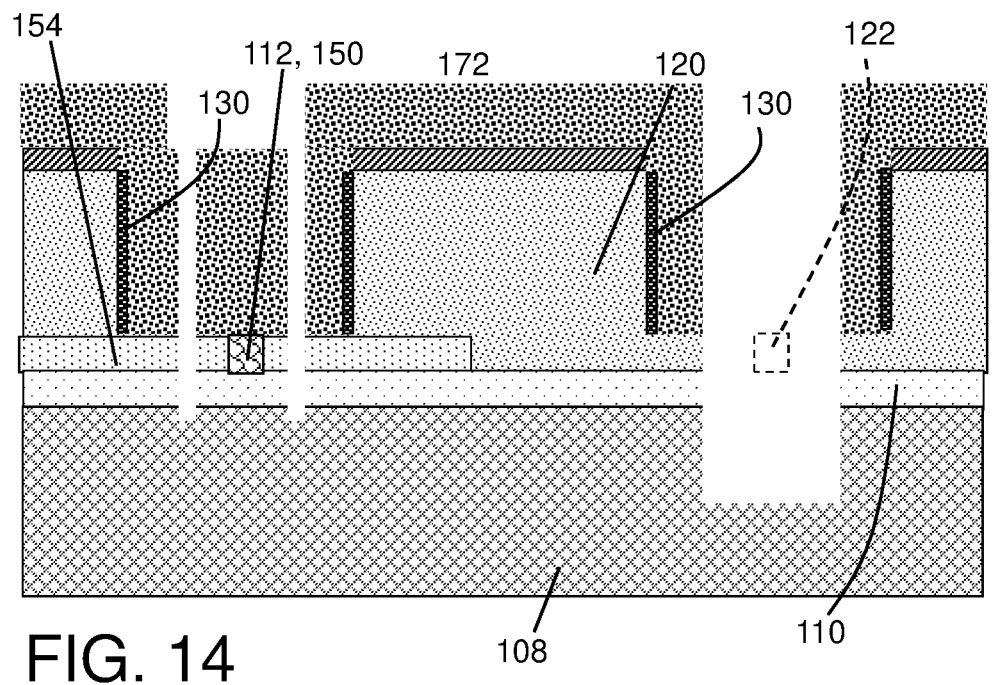
FIG. 14 shows a cross-sectional view of a first step for forming a squared groove for mounting a fiber optic cable for the SiN waveguide edge coupler, according to embodiments of the disclosure.
Figure 15:
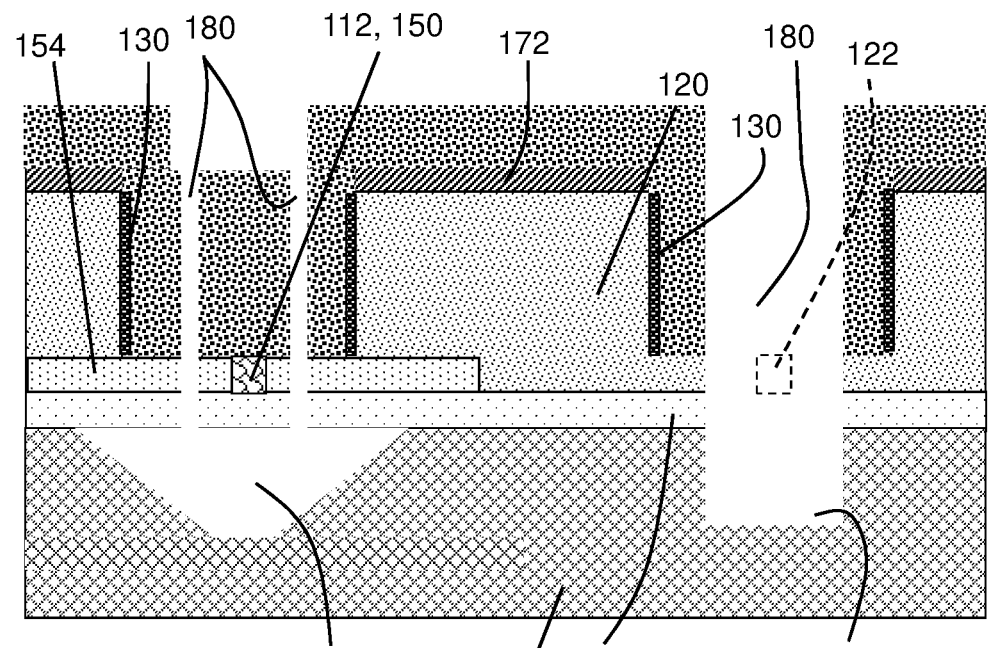
FIG. 15 shows a cross-sectional view of a second step for forming a V-groove for mounting another fiber optic cable for the Si waveguide edge coupler, according to embodiments of the disclosure.

FIGS. 14-15 show forming a V-groove 146 defined in semiconductor substrate 108 at an end of silicon waveguide edge coupler 150, and forming a squared groove 144 defined in semiconductor substrate 108 at an end of SiN waveguide edge coupler 122. As shown in FIG. 14, squared groove 144 may be formed by etching oxide layer 130, STI 154 and buried insulator layer 10, and etching to remove semiconductor substrate 108. Different etching processes can be used for each groove 144, 146, e.g., a high aspect ratio plasma etch such a cyclic isotropic etch for squared groove 144, and crystallographic tetramethylammonium hydroxide (TMAH) etch for V-groove 146. As also shown in FIG. 14, openings 180 through oxide layer 130, STI 154 and buried insulator layer 110 may be formed with V-groove 146. As shown in FIG. 15, V-groove 146 may be formed by additional etching to remove semiconductor substrate 108, as described in co-pending U.S. patent application Ser. No. 16/807,811, filed Mar. 3, 2020, which is hereby incorporated by reference.

FIG. 5 shows optically coupling fiber optic cable 156 (FIG. 4) in V-groove 146 to Si waveguide edge coupler 150, and any of FIGS. 2 and 7-9, show optically coupling fiber optic cable 124 in squared groove 144 to SiN waveguide edge coupler 122. Epoxy or polymer 148 may be used, as previously described.

Embodiments of the disclosure provide a SiN waveguide to an edge for optical coupling with monolithic CMOS integration.

The method as described above is used in the fabrication of PICs. The resulting PICs can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The product can be any product that includes integrated circuit chips, ranging from toys and other low-end applications to advanced computer products having a display, a keyboard or other input device, and a central processor.

The terminology used herein is for describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A photonics integrated circuit (PIC), comprising:
   a semiconductor substrate;
   a buried insulator layer positioned over the semiconductor substrate;
   a back-end-of-line (BEOL) insulator stack over a first portion of the buried insulator layer;
   a silicon nitride (SiN) waveguide edge coupler positioned in a first region over the buried insulator layer and at least partially under the BEOL insulator stack; and
   a first oxide layer extending over a side of the BEOL insulator stack.

2. The PIC of claim 1, further comprising:
   a squared groove defined in the semiconductor substrate.

3. The PIC of claim 2, further comprising:
   a silicon waveguide edge coupler positioned in a second region over the buried insulator layer and under the BEOL insulator stack; and
   a V-groove defined in the semiconductor substrate.

4. The PIC of claim 1, wherein the SiN waveguide edge coupler is entirely enclosed by the BEOL insulator stack.

5. The PIC of claim 1, wherein the SiN waveguide edge coupler includes an end extending into the first oxide layer from under the BEOL insulator stack.

6. The PIC of claim 1, wherein the SiN waveguide edge coupler extends under the first oxide layer to an outer edge of the first oxide layer, the buried insulator layer and the semiconductor substrate.

7. The PIC of claim 6, further comprising a moisture barrier layer between the first oxide layer and the side of the BEOL insulator stack.

8. The PIC of claim 7, wherein the moisture barrier layer also extends between the first oxide layer and the SiN waveguide edge coupler.

9. The PIC of claim 7, further comprising a low refractive index dielectric layer extending between the first oxide layer and the SiN waveguide edge coupler.

10. The PIC of claim 1, further comprising a second oxide layer between the SiN waveguide edge coupler and the buried insulator layer.

11. The PIC of claim 1, further comprising an optical component positioned over the SiN waveguide edge coupler and above the buried insulator layer, and further comprising a complementary metal oxide semiconductor (CMOS) region including CMOS-based integrated circuits, the CMOS region operatively coupled to the SiN waveguide edge coupler.

12. A photonics integrated circuit (PIC), comprising:
    a semiconductor substrate;
    a buried insulator layer positioned over the semiconductor substrate;
    a back-end-of-line (BEOL) insulator stack over the buried insulator layer;
    a silicon nitride (SiN) waveguide edge coupler over the buried insulator layer and at least partially under the BEOL insulator stack;
    an oxide layer extending over a side of the BEOL insulator stack adjacent the SiN waveguide edge coupler; and
    a silicon waveguide edge coupler in a semiconductor layer over the buried insulator layer and under the BEOL insulator stack.

13. The PIC of claim 12, wherein the SiN waveguide edge coupler includes an end extending into the oxide layer from under the BEOL insulator stack.

14. The PIC of claim 12, wherein the SiN waveguide edge coupler extends under the oxide layer to an outer edge of the oxide layer, the buried insulator layer and the semiconductor substrate, and further comprising a moisture barrier layer between the oxide layer and the side of the BEOL insulator stack.

15. The PIC of claim 14, wherein the moisture barrier layer also extends between the oxide layer and the SiN waveguide edge coupler.

16. The PIC of claim 14, further comprising a low refractive index dielectric layer of the BEOL insulator stack extending between the oxide layer and the SiN waveguide edge coupler.

17. The PIC of claim 12, wherein the SiN waveguide edge coupler is entirely enclosed by the BEOL insulator stack.

18. A method, comprising:
    forming a silicon waveguide edge coupler in a semiconductor layer over a buried insulator layer over a semiconductor substrate;
    forming a silicon nitride waveguide edge coupler over the buried insulator layer over the semiconductor substrate, wherein at least part of a back-end-of-line (BEOL) insulator stack is over the silicon waveguide edge coupler and the silicon nitride waveguide edge coupler;
    forming an oxide layer over the silicon waveguide edge coupler, the silicon nitride waveguide edge coupler and the BEOL insulator stack;
    forming a V-groove defined in the semiconductor substrate at an end of the silicon waveguide edge coupler; and
    forming a squared groove defined in the semiconductor substrate at an end of the silicon nitride waveguide edge coupler.

19. The method of claim 18, further comprising forming a moisture barrier layer over at least a sidewall of the BEOL insulator stack adjacent the silicon waveguide edge coupler and adjacent the silicon nitride waveguide edge coupler.

20. The method of claim 18, wherein a part of the BEOL insulator stack is over the silicon waveguide edge coupler and the silicon nitride waveguide edge coupler.

* * * * *